Patented Mar. 12, 1946

2,396,430

UNITED STATES PATENT OFFICE 2,396,430

PIGMENTED PROLAMINE COMPOSITION

James S. Massarene, Oradell, N. J., assignor to Interchemical Corporation, New York, N. Y., a corporation of Ohio No Drawing. Application April 19, 1941,
Serial No. 389,328

8 Claims. (Cl. 106—24)

This invention relates to the preparation of pigmented compositions from prolamines, and is directed particularly to the preparation of aqueous printing inks and the like from prolamines such as zein.

It has been proposed to make water paints and printing inks from the prolamines such as zein, using alcohols as solvents. It has also been proposed that similar compositions be made, in which the protein is dissolved in an aqueous alkaline liquid.

However, both types of compositions tend to be unstable on storage—the alcoholic compositions tend to absorb water from the air, and to precipitate as a result thereof, and the aqueous pastes spoil on storage.

I have discovered that a very superior form of pigmented prolamine composition can be prepared which is stable on storage and gives inks and paints of optimum stability and color. This comprises a heavy paste made by kneading together, or otherwise dispersing, a substantially dry prolamine of the zein group (including gliadin, hordeine and related prolamines), and pigment in detergent-soap-forming acids having no solvent action on the prolamine, until a heavy paste or plastic is obtained with the prolamine and pigment uniformly distributed through the acids. This paste can be made into a finished ink merely by dissolving in dilute aqueous alkali (e. g., 2–4% ammonia solution) the fatty acid not made into soap is emulsified into the composition.

The dispersion preferably contains some plasticizer for the prolamine, urea being the preferred plasticizer. Other known plasticizers can of course be substituted, such as fatty oils and the chemical plasticizers.

It is important that substantial quantities of water be absent from the dispersions, since water reduces their storage stability markedly.

Substantially any method of dispersion may be used to prepare the paste. A heavy duty dough mixer is very satisfactory; successful dispersion may also be obtained on a two roll mill, which produces a heavy plastic, or in a screw extrusion machine such as is used in the plastics industry.

The ratio of detergent acid to dry ingredients will vary depending on the oil absorption of the pigment, and on the form of the protein powder. In general, the amount of acid used will vary from about 50% of the prolamine content to about 200% of the prolamine content, and will generally comprise from about 10 to about 45% of the total mass.

Of the various detergent-soap-forming acids, I prefer to use tall oil, since the unsaponifiable constituents of this material appear to promote dispersion and ready solubility of the prolamine in dilute aqueous alkali. I have, however, used other acids which yield detergent soaps, having successfully used abietic acid and various fatty acids, including the saturated fatty acids from lauric to stearic acids, oleic acid, and mixed fatty acids obtained from such oils as cotton seed, castor, cocoanut and sunflower oils.

Typical examples of my invention are the following:

EXAMPLE 1

Blue dispersion

| | Per cent |
|---|---|
| Prussian blue | 39 |
| Zein | 23 |
| Urea | 6 |
| Tall oil | 32 |

The mass is malaxated in a dough mixer, to give a dispersion readily soluble in dilute aqueous ammonia to form a satisfactory film-forming composition. Thus, an ink may be made as follows:

EXAMPLE 2

Inks

2% of 28% ammonia are mixed with 63% of water. This solution is gradually added to 35% of the dispersion of Example 1, to yield a satisfactory ink.

EXAMPLE 3

Chrome yellow dispersion

| | Per cent |
|---|---|
| Chrome yellow | 63 |
| Zein | 22 |
| Urea | 4 |
| Tall oil | 11 |

This mass is treated as in Example 1, except that it is malaxated on a two roll mill.

EXAMPLE 4

Alkali blue dispersion

| | Per cent |
|---|---|
| Alkali blue—dry | 34 |
| Zein | 21 |
| Urea | 4 |
| Tall oil | 40 |

Compounded as in Example 1.

EXAMPLE 5

Unplasticized blue

| | Per cent |
|---|---|
| Prussian blue | 42 |
| Zein | 26 |
| Tall oil | 32 |

Finished as in Example 1. When making inks, it is desirable to add plasticizer.

EXAMPLE 6

*Blue dispersion*

|  | Per cent |
|---|---|
| Prussian blue | 39 |
| Zein | 23 |
| Urea | 4 |
| Soya bean fatty acids | 34 |

Made like Example 1.

In making up the finished compositions from the dispersions, I prefer to use a volatile alkali such as ammonia, morpholine and the like, so that on drying the composition becomes insoluble in water. Fixed alkalies may, of course, be used where solubility of the film is not objectionable. Furthermore, the acid employed in the dispersion may be a drying oil acid, and improved water resistance may be developed by oxidation of the drying oil fatty acid.

It is, of course, sometimes desirable, in making the finished inks, to add additional ingredients thereto, to improve certain properties. Thus, higher alcohols, (e. g. octyl or dodecyl alcohol) may be added in small quantities to the inks as anti-foaming agents; and small quantities of water-miscible solvents for the prolamine (e. g. the water-soluble mono- and polyalcohols and alcohol ethers, such as ethanol, glycol, diethylene glycol, etc.) may be added to improve the printing properties of the inks.

The examples shown may, of course, be multiplied indefinitely, and various changes made therein, without departing from the scope of the invention as defined in the claims.

I claim:

1. A storage stable pigmented composition consisting substantially completely of non-volatile ingredients and dispersible in dilute aqueous alkali to yield a pigmented film-forming liquid, comprising a substantially non-aqueous dispersion of pigment in a prolamine of the zein group and a detergent-soap-forming acid comprising from 10% to 45% by weight of the composition, and from 50 to 200% of the weight of the prolamine.

2. A storage stable pigmented composition consisting substantially completely of non-volatile ingredients and dispersible in dilute aqueous alkali to yield a pigmented film-forming liquid, comprising a substantially non-aqueous dispersion of pigment in zein and a detergent-soap-forming acid present in a quantity from 50% to 200% of the weight of the zein, and from 10 to 45% of the entire composition.

3. The composition of claim 2 in which the acid is tall oil.

4. The composition of claim 2 in which the acid is soya fatty acid.

5. The method which comprises malaxating, in the absence of substantial quantities of water and volatile solvent, a pigment with zein and a detergent-soap-forming acid comprising from 10 to 45% of the total mixture, and from 50 to 200% of the weight of the zein, until the pigment is uniformly distributed through the zein-acid complex.

6. A storage-stable pigmented composition dispersible in dilute aqueous alkali to yield a pigmented film-forming vehicle, consisting substantially of a non-aqueous dispersion of pigment in a vehicle consisting essentially of zein and a detergent-soap-forming acid present in a quantity from 50% to 200% of the weight of the zein, and from 10% to 45% of the entire composition.

7. A storage-stable pigmented composition dispersible in dilute aqueous alkali to yield a pigmented film-forming vehicle, consisting substantially of a non-aqueous dispersion of pigment in a vehicle consisting essentially of zein and a detergent-soap-forming acid present in a quantity from 50% to 200% of the weight of the zein, and from 10% to 45% of the entire composition, the composition containing as a very minor ingredient a small proportion of plasticizer for the zein.

8. A storage-stable pigmented composition dispersible in dilute aqueous alkali to yield a pigmented film-forming vehicle, consisting substantially of a non-aqueous dispersion of pigment in a vehicle consisting essentially of zein and a detergent-soap-forming acid present in a quantity from 50% to 200% of the weight of the zein, and from 10% to 45% of the entire composition, the composition containing as a very minor ingredient a small proportion of urea as plasticizer for the zein.

JAMES S. MASSARENE.

---

Certificate of Correction

Patent No. 2,396,430.                           March 12, 1946.

JAMES S. MASSARENE

It is hereby certified that error appears in the printed specification of the above numbered patent requiring correction as follows: Page 2, second column, lines 23, 31 and 41, claims 6, 7 and 8 respectively, after the word "non-aqueous" insert *and solvent free*; and that the said Letters Patent should be read with this correction therein that the same may conform to the record of the case in the Patent Office.

Signed and sealed this 21st day of May, A. D. 1946.

[SEAL]

LESLIE FRAZER,
*First Assistant Commissioner of Patents.*

Finished as in Example 1. When making inks, it is desirable to add plasticizer.

EXAMPLE 6

*Blue dispersion*

| | Per cent |
|---|---|
| Prussian blue | 39 |
| Zein | 23 |
| Urea | 4 |
| Soya bean fatty acids | 34 |

Made like Example 1.

In making up the finished compositions from the dispersions, I prefer to use a volatile alkali such as ammonia, morpholine and the like, so that on drying the composition becomes insoluble in water. Fixed alkalies may, of course, be used where solubility of the film is not objectionable. Furthermore, the acid employed in the dispersion may be a drying oil acid, and improved water resistance may be developed by oxidation of the drying oil fatty acid.

It is, of course, sometimes desirable, in making the finished inks, to add additional ingredients thereto, to improve certain properties. Thus, higher alcohols (e. g. octyl or dodecyl alcohol) may be added in small quantities to the inks as anti-foaming agents; and small quantities of water-miscible solvents for the prolamine (e. g. the water-soluble mono- and polyalcohols and alcohol ethers, such as ethanol, glycol, diethylene glycol, etc.) may be added to improve the printing properties of the inks.

The examples shown may, of course, be multiplied indefinitely, and various changes made therein, without departing from the scope of the invention as defined in the claims.

I claim:

1. A storage stable pigmented composition consisting substantially completely of non-volatile ingredients and dispersible in dilute aqueous alkali to yield a pigmented film-forming liquid, comprising a substantially non-aqueous dispersion of pigment in a prolamine of the zein group and a detergent-soap-forming acid comprising from 10% to 45% by weight of the composition, and from 50 to 200% of the weight of the prolamine.

2. A storage stable pigmented composition consisting substantially completely of non-volatile ingredients and dispersible in dilute aqueous alkali to yield a pigmented film-forming liquid, comprising a substantially non-aqueous dispersion of pigment in zein and a detergent-soap-forming acid present in a quantity from 50% to 200% of the weight of the zein, and from 10 to 45% of the entire composition.

3. The composition of claim 2 in which the acid is tall oil.

4. The composition of claim 2 in which the acid is soya fatty acid.

5. The method which comprises malaxating, in the absence of substantial quantities of water and volatile solvent, a pigment with zein and a detergent-soap-forming acid comprising from 10 to 45% of the total mixture, and from 50 to 200% of the weight of the zein, until the pigment is uniformly distributed through the zein-acid complex.

6. A storage-stable pigmented composition dispersible in dilute aqueous alkali to yield a pigmented film-forming vehicle, consisting substantially of a non-aqueous dispersion of pigment in a vehicle consisting essentially of zein and a detergent-soap-forming acid present in a quantity from 50% to 200% of the weight of the zein, and from 10% to 45% of the entire composition.

7. A storage-stable pigmented composition dispersible in dilute aqueous alkali to yield a pigmented film-forming vehicle, consisting substantially of a non-aqueous dispersion of pigment in a vehicle consisting essentially of zein and a detergent-soap-forming acid present in a quantity from 50% to 200% of the weight of the zein, and from 10% to 45% of the entire composition, the composition containing as a very minor ingredient a small proportion of plasticizer for the zein.

8. A storage-stable pigmented composition dispersible in dilute aqueous alkali to yield a pigmented film-forming vehicle, consisting substantially of a non-aqueous dispersion of pigment in a vehicle consisting essentially of zein and a detergent-soap-forming acid present in a quantity from 50% to 200% of the weight of the zein, and from 10% to 45% of the entire composition, the composition containing as a very minor ingredient a small proportion of urea as plasticizer for the zein.

JAMES S. MASSARENE.

---

Certificate of Correction

Patent No. 2,396,430.    March 12, 1946.

JAMES S. MASSARENE

It is hereby certified that error appears in the printed specification of the above numbered patent requiring correction as follows: Page 2, second column, lines 23, 31 and 41, claims 6, 7 and 8 respectively, after the word "non-aqueous" insert *and solvent free*; and that the said Letters Patent should be read with this correction therein that the same may conform to the record of the case in the Patent Office.

Signed and sealed this 21st day of May, A. D. 1946.

[SEAL]

LESLIE FRAZER,
*First Assistant Commissioner of Patents.*